United States Patent [19]

Hagan et al.

[11] Patent Number: 4,756,347

[45] Date of Patent: Jul. 12, 1988

[54] FILLING AND DISPENSING VALVE, ADAPTER AND PACKAGE

[75] Inventors: Richard J. Hagan, San Carlos; John McIntyre, Foster City, both of Calif.

[73] Assignee: Jopado Baderi, Saratoga, Calif.

[21] Appl. No.: 820,400

[22] Filed: Jan. 17, 1986

Related U.S. Application Data

[63] Continuation-in-part of Ser. No. 799,436, Nov. 19, 1985, abandoned.

[51] Int. Cl.[4] .......................... B67C 3/02; F16K 29/00

[52] U.S. Cl. ...................................... 141/21; 137/212; 137/322; 222/400.7; 222/635

[58] Field of Search ...................... 137/1, 12.5, 14, 15, 137/154, 212, 264, 315, 322; 141/2, 3, 20, 21, 290, 292, 296, 301, 348, 349; 222/1, 400.7, 635; 251/89, 89.5, 144, 149.6, 149.9, 297

[56] References Cited

U.S. PATENT DOCUMENTS

| | | | |
|---|---|---|---|
| 3,195,569 | 7/1965 | Seaquist | 251/297 |
| 3,390,820 | 7/1968 | Marraffino et al. | 222/635 |
| 3,473,556 | 10/1969 | Johnson et al. | 222/400.7 X |
| 3,473,704 | 10/1969 | O'Donnell | 141/20 X |
| 3,669,313 | 6/1972 | Marand et al. | 222/635 X |
| 3,746,059 | 7/1973 | Mizuguchi | 137/322 X |
| 3,871,422 | 3/1975 | Elson et al. | 141/348 X |
| 4,193,576 | 3/1980 | White | 137/322 X |

FOREIGN PATENT DOCUMENTS

| | | | |
|---|---|---|---|
| 1256767 | 2/1961 | France | 141/349 |

*Primary Examiner*—Mark J. Thronson
*Attorney, Agent, or Firm*—Flehr, Hohbach, Test, Albritton & Herbert

[57] ABSTRACT

A valve assembly (52) has a valve housing (64) which fits in neck (76) of container (50). Valve member (88) is slidably movable in housing (64). Housing (64) has a plurality of grooves (86) and apertures (80), which interact with flanges (92, 94, 96) to define flow paths in the valve assembly (52). The flanges (92, 94, 96), inside surface (84), apertures (80), slots (86) and valve member (88) provide a flow path through the valve assembly (52) when the valve member (88) is in its downward position inside housing (64) and seal the flow path when the valve member (88) is in its upward position. A spring (102) urges the valve member (88) to its upward position.

45 Claims, 12 Drawing Sheets

FILLING AND DISPENSING VALVE, ADAPTER AND PACKAGE

ORIGIN OF APPLICATION

This application is a continuation in part of earlier filed application Ser. No. 799,436, filed Nov. 19, 1985, in the name of Richard J. Hagan, now abandoned.

BACKGROUND OF THE INVENTION

1. Field of the Invention

This invention relates to an improved valve assembly and adapter for use with the valve assembly particularly adapted for use with containers for liquids to give an improved package. More particularly, it relates to such an improved valve structure which can be adapted to serve a variety of liquid packaging needs. Most especially, it relates to a valve assembly through which a container may be filled with a liquid and the liquid subsequently dispensed from the container in an improved manner.

2. Description of the Prior Art

As the need to simplify and reduce packaging costs of such different liquid products as draft beer and aerosol sprays has become increasingly severe, producers of these products have begun to consider alternatives to traditional metal or glass containers. The development of the so-called "Beer Sphere" and the consideration of plastic packaging for aerosol spray products are representative of these trends. While packaging technology for liquids is thus undergoing a period of rapid change and development, valve design has not kept pace. To a certain extent, conventional valve designs can be adapted for new container technologies, but this results in unnecessary difficulty and expense.

With respect to beer valve technology, representative prior art includes the following patents to Johnston: U.S. Pat. No. 3,861,569, issued Jan. 21, 1975; U.S. Pat. No. 3,866,626, issued Feb. 18, 1975 and U.S. Pat. No. 3,868,049, issued Feb. 25, 1975.

With respect to aerosol spray and related packaging technology, representative prior art includes the following U.S. patents: U.S. Pat. No. 2,500,119, issued Mar. 7, 1950 to Cooper; U.S. Pat. No. 2,543,850, issued Mar. 6, 1951 to Henricson; U.S. Pat. No. 2,631,814 and U.S. Pat. No. 2,799,435, issued Mar. 17, 1953 and July 16, 1957, respectively, to Abplanalp; U.S. Pat. No. 2,863,699, issued Dec. 9, 1958 to Elser; U.S. Pat. No. 2,913,749, issued Nov. 24, 1959 to Ayres; U.S. Pat. No. 3,333,743, issued Aug. 1, 1967 to Meyers; U.S. Pat. No. 3,348,742, issued Oct. 24, 1967 to Assalit; and U.S. Pat. No. 3,863,673, issued Feb. 4, 1975 to Sitton. Other prior art references describing such valves and packages include French patent application No. 2,462,629, published Feb. 13, 1981; European patent application No. 97,094, published Dec. 28, 1983 and French patent application No. 2,382,946, published Oct. 6, 1978.

The state of the art in liquid packaging technology is further indicated by Proceedings of Ryder Conference, 1985; Ninth International Conference on Oriented Plastic Containers, presented on Mar. 25-27, 1985, C. E. Sroog, R. J. Albert, F. P. Gay, and S. J. Seckner, "PET Aerosols Technology and Applications," pages 245-28, and in the earlier filed, co-pending applications as follows: Ser. No. 685,912, filed Dec. 27, 1984 and entitled "Method and Apparatus for Storing and Dispensing Fluids Containered Under Gas Pressure"; Ser. No. 635,450, filed July 31, 1984 and entitled "Syphon Assembly and Package Incorporating the Assembly"; Ser. No. 687,296, filed Dec. 28, 1984 and entitled "Integral Syphon Package Head", all filed in the name of Richard J. Hagan and Hagan and Lempert, Ser. No. 704,763, filed Feb. 20, 1985 and entitled "Seltzer Filling Apparatus and Process". While the art relating to the packaging and dispensing of liquids is therefore a well developed one, a need still remains for further development of valve designs to meet the demands of newer packaging technology for liquids.

SUMMARY OF THE INVENTION

Accordingly, it is an object of this invention to provide a valve assembly design which can be adapted to meet a variety of specific requirements in the packaging of liquids.

It is another object of the invention to provide such a valve assembly design incorporating multiple flow paths.

It is a further object of the invention to provide such a valve assembly design of simplified construction that will allow draft beer containers to be filled and the draft beer to be dispensed through the valve assembly.

It is still another object of the invention to provide such a draft beer valve assembly design which will dispense the draft beer from a container with a minimum of agitation of the beer as it passes through the valve assembly.

It is another object of the invention to provide such a draft beer valve assembly design whioh is easily fabricated from plastic parts in a molding process.

It is yet another object of the invention to provide a draft beer container incorporating such a valve assembly design in which air for pressurizing the container may be supplied through the valve assembly and not contact the draft beer in the container.

It is still another object of the invention to provide an improved adapter and valve assembly combination for use in dispensing draft beer from a container and for pressurizing the container for dispensing the draft beer.

It is a still further object of the invention to provide such a valve assembly and adapter combination which incorporates an improved seal between the valve assembly and the adapter.

It is still another object of the invention to provide such a valve assembly which is locked open for dispensing and after the container is empty, so that hazardous pressures will not be created in subsequent handling of the empty container.

It is another object of the invention to provide such a valve assembly which is configured for easy fabrication by a molding process.

It is still another object of the invention to provide such a valve assembly which will allow flow rate from a pressurized liquid container to be regulated by operation of the valve assembly.

It is a still further object of the invention to provide such a valve assembly design which produces improved mixing of an aerosol spray in the valve.

The attainment of these and related objects may be achieved through use of the novel valve assembly design and package incorporating the valve assembly design herein disclosed. A valve assembly in accordance with this invention includes an insert dimensioned and configured to fit in a necked opening of a container. The insert defines a valve housing. A valve member is slidably mounted in the valve housing. The valve housing has a plurality of apertures located along a path of travel of the valve member in the valve housing. The apertures extend through the housing to an interior surface thereof. The valve member and the valve housing have a plurality of projections spaced along their length and engaging the interior surface of the valve housing and the valve member in sealing relationship. The projections, housing interior surface, apertures and valve member coact to provide a flow path through the valve when the valve member is in a first position and seal the flow path when the valve member is in a second position. A means biases the valve member to the second position.

To operate the valve assembly of this invention, force in opposition to the force of the biasing means is applied to the valve member to displace it from the second position to the first position. Removal of the opposing force allows the force of the biasing means to return the valve member to the second position, to shut off the valve.

The number and positioning of the projections and the number and positioning of the apertures is varied in the design to meet specific needs in the packaging of different liquids in different environments. For example, one form of the valve assembly allows a draft beer container to be filled while removing entrapped air from head space in the container through the valve, and subsequent dispensing of the draft beer through the valve assembly. Another form of the valve assembly allows flow rate of aerosol sprays to be regulated from an aerosol spray container. Still another form of the valve assembly provides improved mixing of an aerosol spray in the valve prior to dispensing from an aerosol spray container.

The attainment of the foregoing and related objects, advantages and features of the invention should be more readily apparent to those skilled in the art, after review of the following more detailed description of the invention, taken together with the drawings, in which:

DETAILED DESCRIPTION OF THE INVENTION

Figure 1:
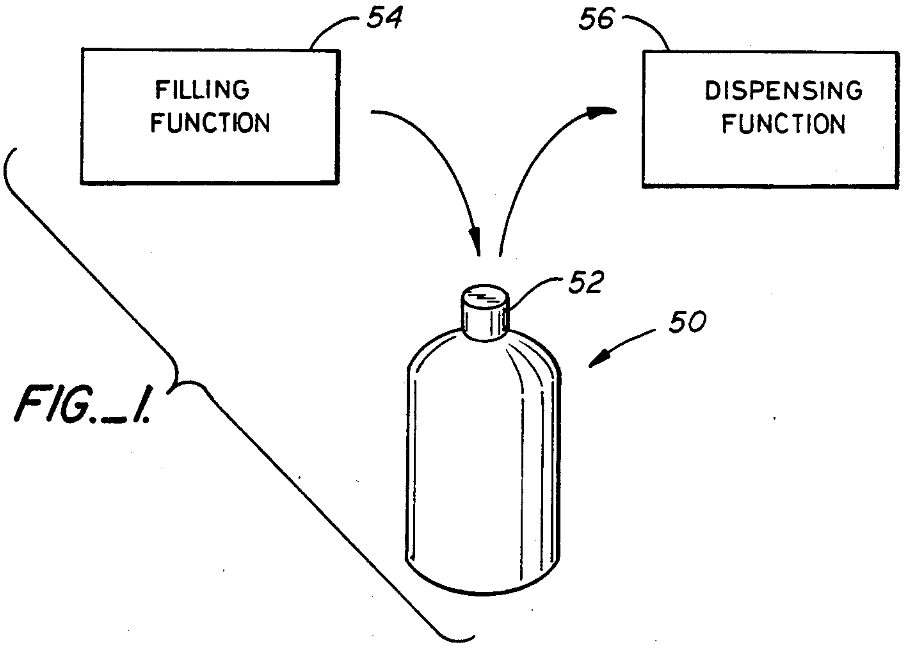
FIG. 1 is a perspective and diagrammatic view useful for understanding certain embodiments of the invention.

Turning now to the drawings, more particularly to FIG. 1, there is shown a container 50 for draft beer, incorporating a valve assembly 52 in accordance with the invention. As indicated at 54 and 56, the valve assembly 52 is used both for filling the container 50 with the draft beer and for dispensing the beer from the container 50.

Figure 2:
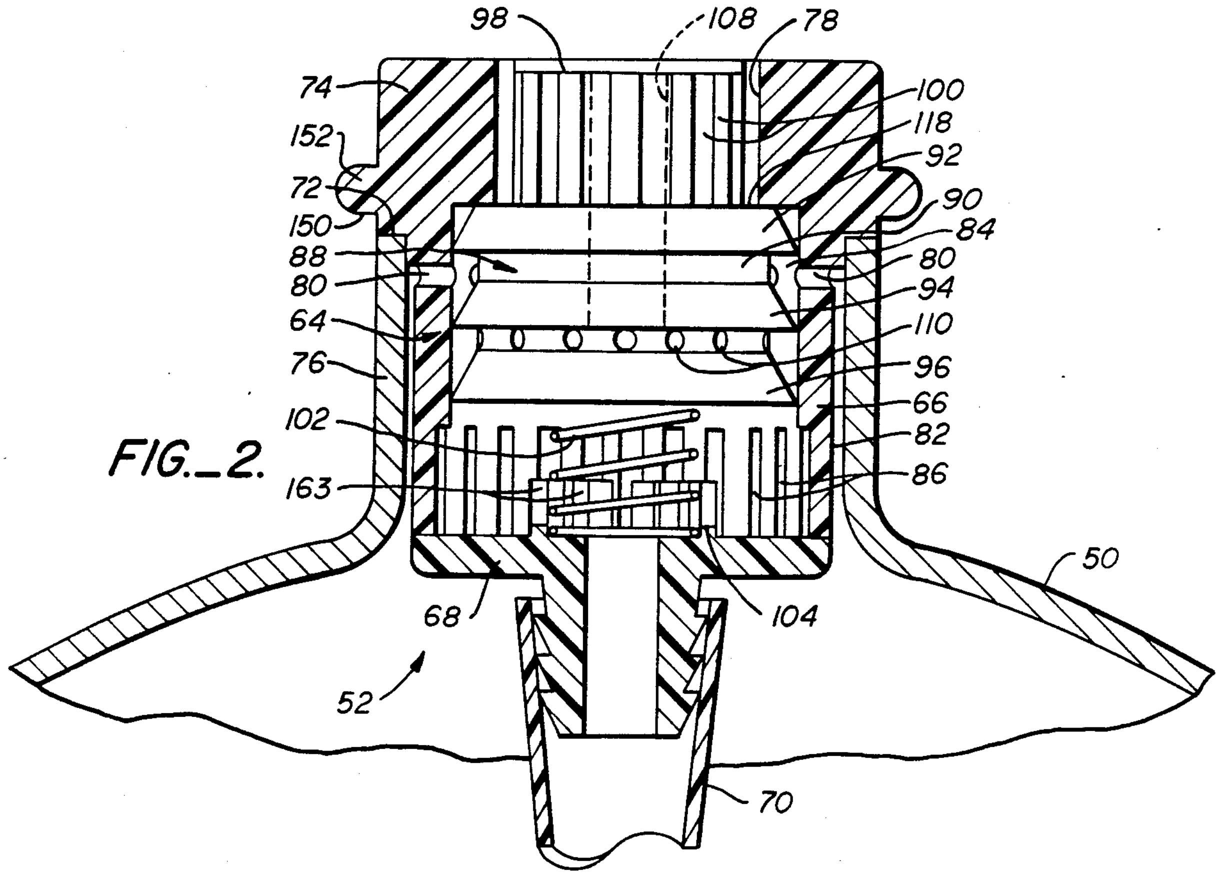
FIG. 2 is a cross-section view of a valve assembly in accordance with the invention.
Figure 3:
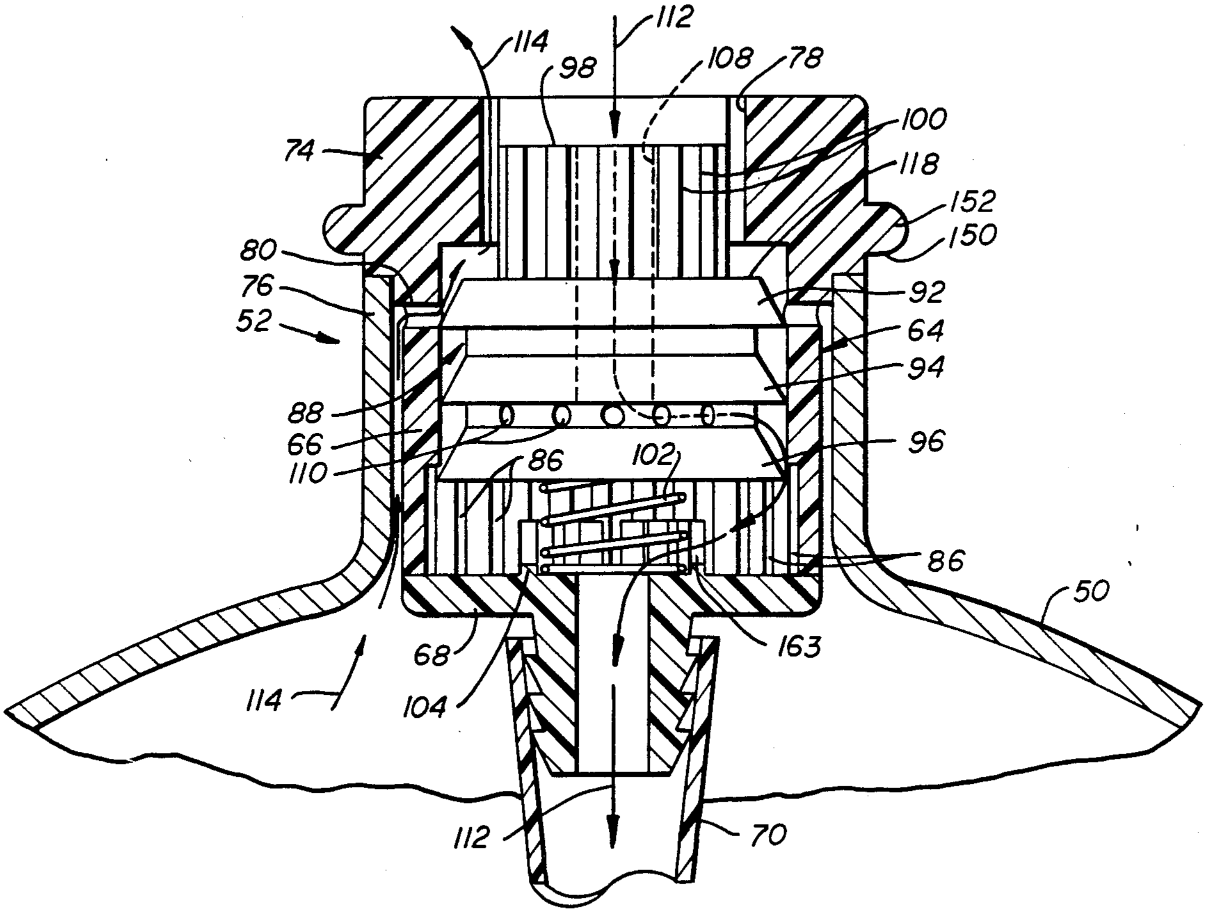
FIG. 3 is another cross-section view of the valve assembly in FIG. 2, but with the valve in operation.
Figure 4:
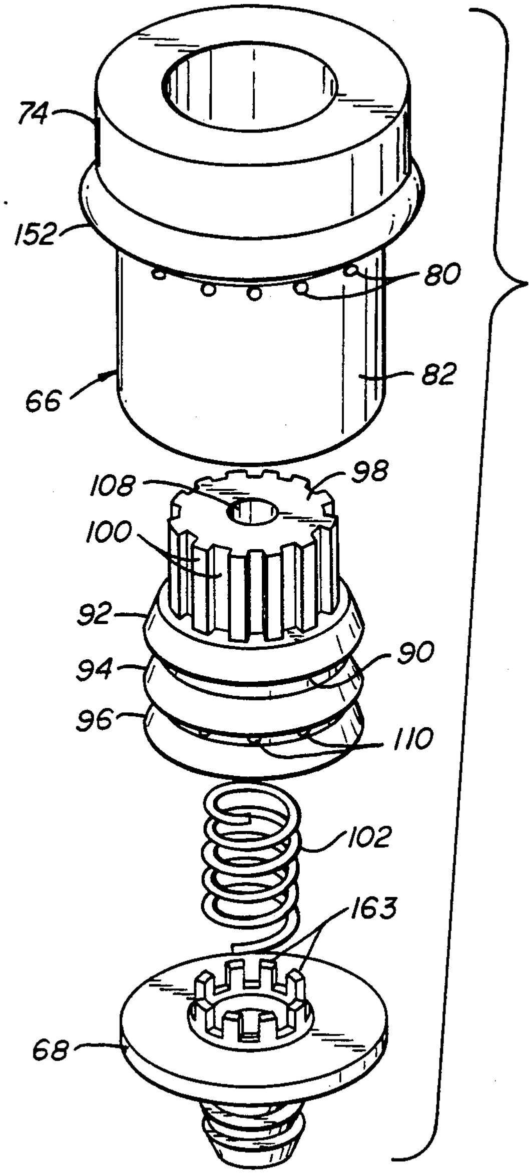
FIG. 4 is an exploded perspective view of the valve assembly in FIGS. 2 and 3.

FIGS. 2, 3 and 4 show the valve assembly 52 in more detail. The valve assembly 52 has a valve housing 64, consisting of a generally cylindrical portion 66 and a syphon tube flange 68 attached to the cylindrical portion 66, such as by ultrasonic bonding or spin welding. A syphon tube 70 is attached to the syphon tube flange 68. If desired, the syphon tube 70 and flange 68 may be integrally formed.

The cylindrical portion 66 has a flange 72 around top 74, by which the cylindrical portion 66 is sealed to neck 76 of the container 50, such as by ultrasonic bonding or spin welding. Top 74 of the portion 66 has a circular opening 78. A first set of apertures 80 extends from exterior surface 82 of the portion 66 to its interior surface 84 near the top 74. A set of grooves 86 extends vertically along the inside surface 84 of the portion 66 just above the syphon tube flange 68.

Valve member 88 is slidably movable inside the valve housing 64 between the top 74 and the syphon tube flange 68. The valve member 88 has a cylindrical body 90 and flanges 92, 94 and 96, which engage the inside surface 84 of the cylindrical portion 66 in sealing relationship. An upper portion 98 of reduced diameter extends through the opening 78 in top 74 of the housing 64. Top portion 98 has a plurality of slots 100 to allow air to escape through the opening 78 when the valve member 88 is pushed away from the top 74 of the housing 64 (see FIG. 3).

A spring 102 urges the valve member 88 against the top 74 of the housing 64 to keep the valve assembly 52 in a normally closed position. Mating projections 104 and 161 (best shown in FIGS. 5 and 6) on the syphon tube flange 68 and the valve member 88, respectively, hold the spring 102 in position. The valve member 88 has a centrally disposed bore 108 extending downward to apertures 110 between the flanges 94 and 96.

To use the valve assembly 52 for filling the container 50, the valve member 88 is displaced downward to the position shown in FIG. 3. This opens a flow path for beer used to fill the container 50, indicated at 112, through the bore 108, apertures 110, grooves 86 and tube 70. A second flow path indicated at 114 is opened between neck 76 of the container 50, portion 66 of the housing 64, through apertures 80, between housing top 74 and top 98 of the valve member 88. As the container 50 fills with the beer through flow path 112, air is exhausted from the container 50 through the flow path 114. When the container 50 is filled with beer, downward force on the valve member 88 is removed, so that spring 102 will return the valve member 88 to the position shown in FIG. 2, with surface 118 of the valve member 88 in sealing relationship against top 74 of the housing 64. Carbonation pressure from the beer further serves to urge the surface 118 against top 74.

Figure 7:
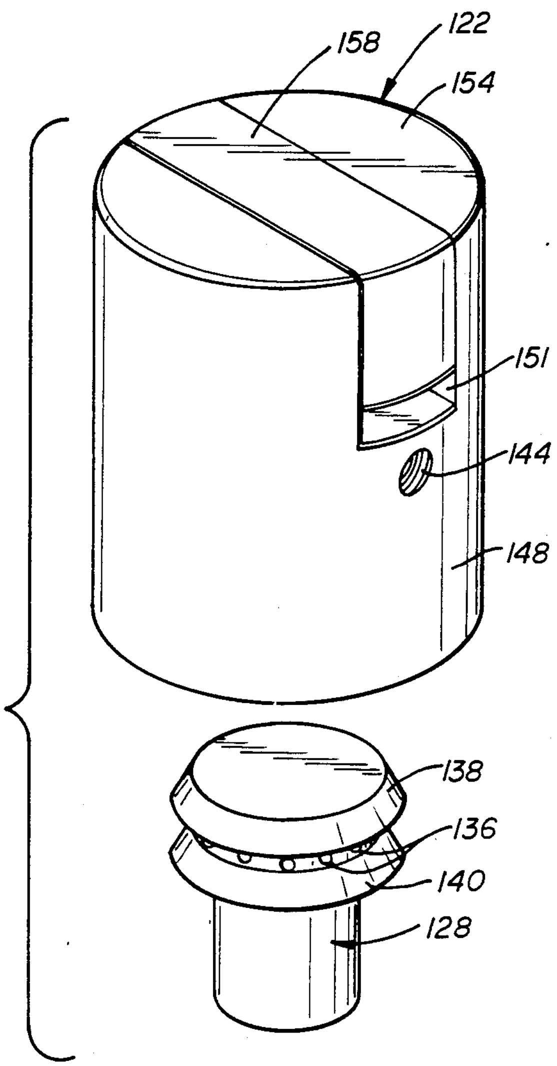
FIG. 7 is an exploded perspective view of the apparatus shown in FIGS. 5 and 6.
Figure 5:
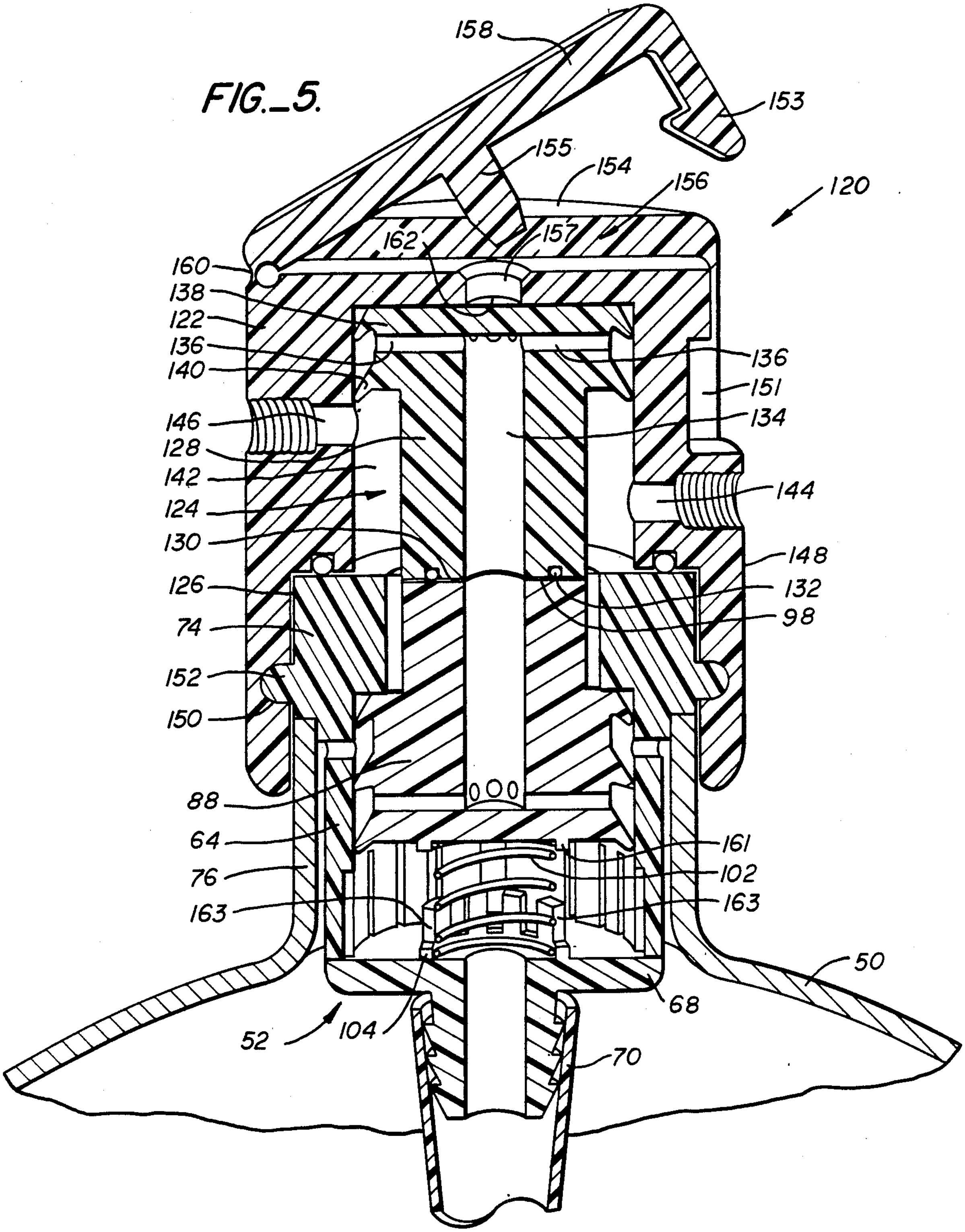
FIG. 5 is a perspective and cross-section view of apparatus further showing use of the valve assembly embodiment of FIGS. 2-4.
Figure 6:
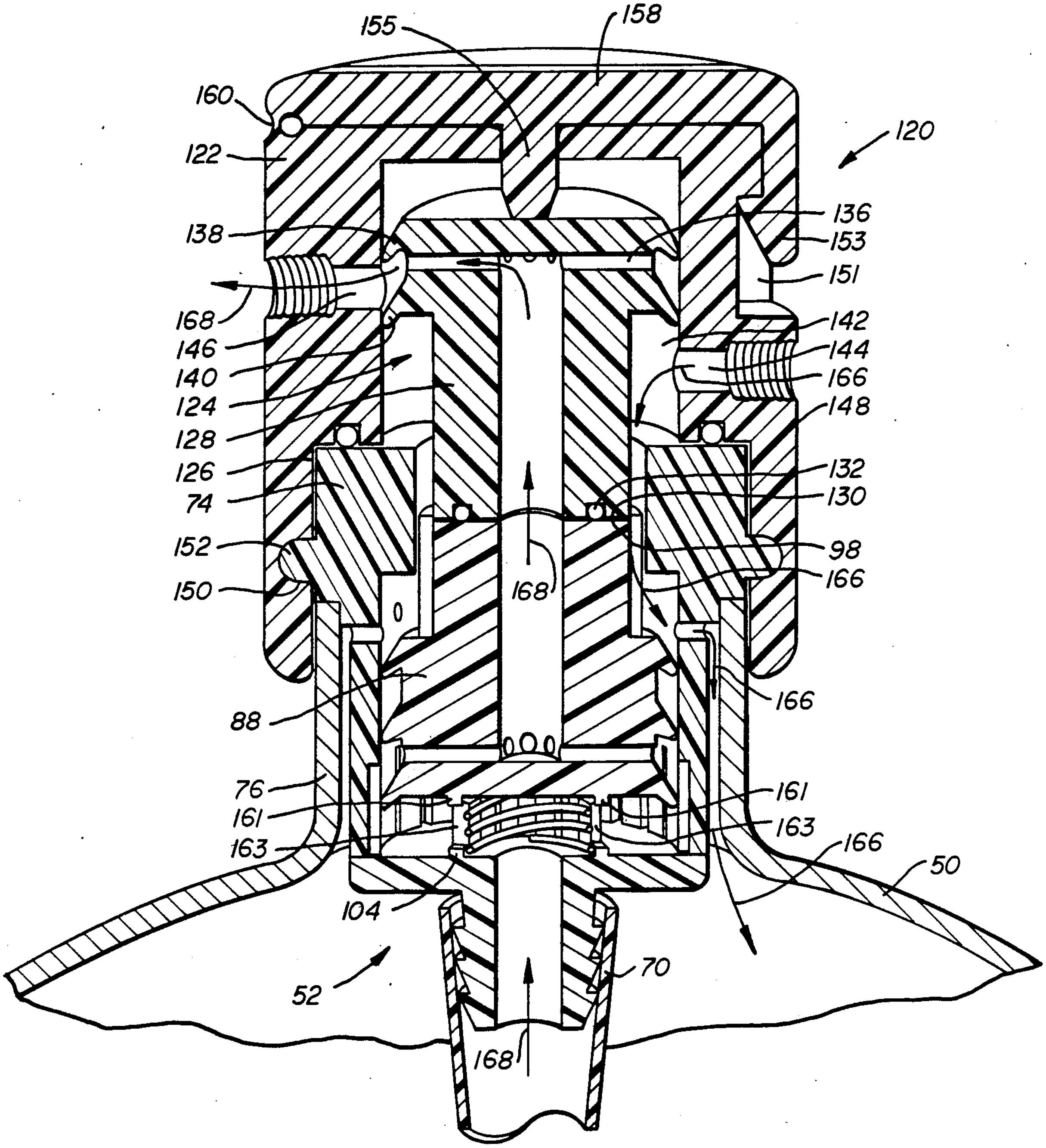
FIG. 6 is another cross-section of the apparatus shown in FIG. 5, but in a different operating position.

FIGS. 5, 6 and 7 show an adapter 120 used to dispense the beer from container 50 through the valve assembly 52. The adapter 120 has a housing 122 with interior passages 124 and 126 of increasing diameter. A mating valve member 128 is slidably mounted in the passage 124 and has end 130 with an O ring seal 132 configured to engage top 98 of the valve member 88 in sealing relationship. The mating valve member 128 has a central bore 134 communicating with apertures 136 between flanges 138 and 140. The flanges 138 and 140 engage interior surface 142 of the passage 124 in sealing relationship. Tapped openings 144 and 146 extend from exterior surface 148 of the housing 122 to interior surface 142 of passage 124. Groove 150 is configured and positioned to engage top 74 of the valve assembly housing 64 at ridge 152 in a bayonet type attachment when the neck 76 of the container 50 is inserted in the passage 126. Top 154 of the housing 122 has a laterally extending slot 156 and an aperture 157 through which projection 155 of an actuating bar 158 extends when the actuating bar 158 rests in slot 156. Clamp 153 engages recess 151 to hold the actuating bar in slot 156. The actuating bar 158 is pivotally attached at 160 to housing 122 on the other side of the housing 122 from the recess 151. projection 155 of the actuating bar 158 engages top 162 of the mating valve member 128 before clamp 153 reaches the recess 151. Additional downward movement of the actuating bar 158 pushes downward on the mating valve member 128 to move mating valve member 128 and valve member 88 downward so that ridge 161 bottoms out on castellations 163 of ridge 104 before the clamp 153 engages recess 151. Further downward movement of the actuating bar squeezes the mating valve member 128 and the valve member 88 together to form a positive seal at O ring 132, which is maintained when the clamp 153 engages the recess 151. This is necessary because the seal at the O ring 132 must be capable of withstanding pressures of at least about 40 psi without leaking when $CO_2$ gas enters through tapped opening 144.

In operation, the adapter 120 is placed over neck 76 of the container 50 with the actuating rod 158 in the position shown in FIG. 5, i.e., with the engaging valve member 128 in its upward position. A source of pressurized carbon dioxide, air, or other suitable gas is connected to the threaded opening 144, and a beer tap is connected to the threaded opening 146. Actuating bar 158 is then moved downward into slot 156 and locked in the downward position in recess 151. Mating valve member 128 is moved down by the actuating bar 158 to the position shown in FIG. 6, thus moving valve member 88 downward to open valve 52, giving flow path 166 for pressurizing gas through the opening 144 and into the container 50, and flow path 168 from the container 50 through the valve member 88 and the valve member 128 to the beer tap. The beer tap may then be opened to dispense the beer, with which the container 50 was filled in the manner described above with respect to FIG. 3, from the container 50 as desired. The valve assembly 52 is therefore used both to fill the container 50 with beer and to dispense the beer in a novel manner.

Figure 8:
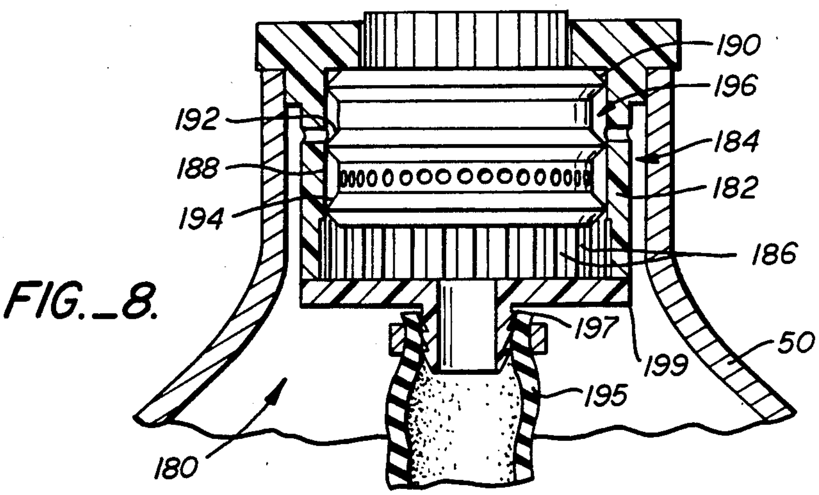
FIG. 8 is a cross-section view of a second valve assembly in accordance with the invention.
Figure 9:
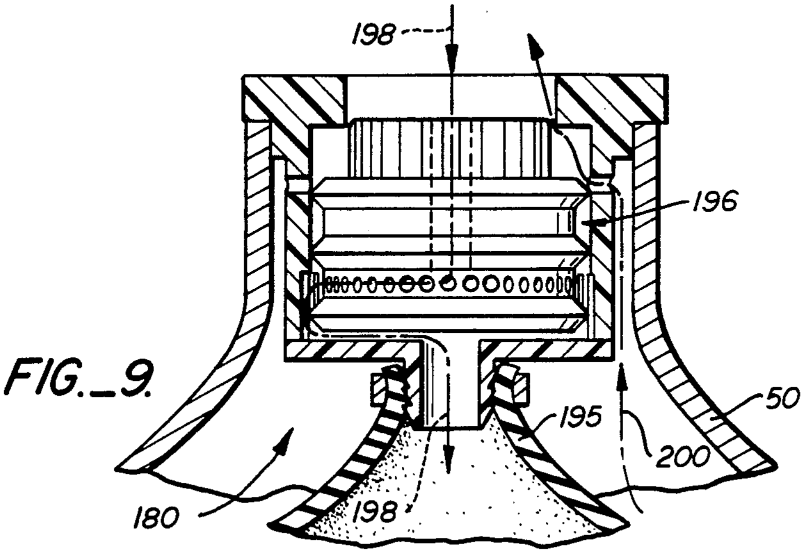
FIGS. 9 and 10 are further cross-section views of the valve assembly in FIG. 8, but in different stages of operation.
Figure 10:
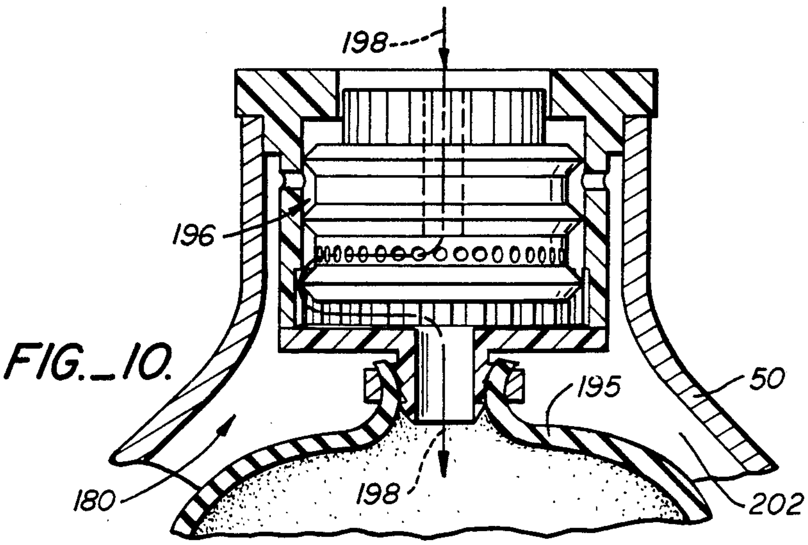
Figure 11:
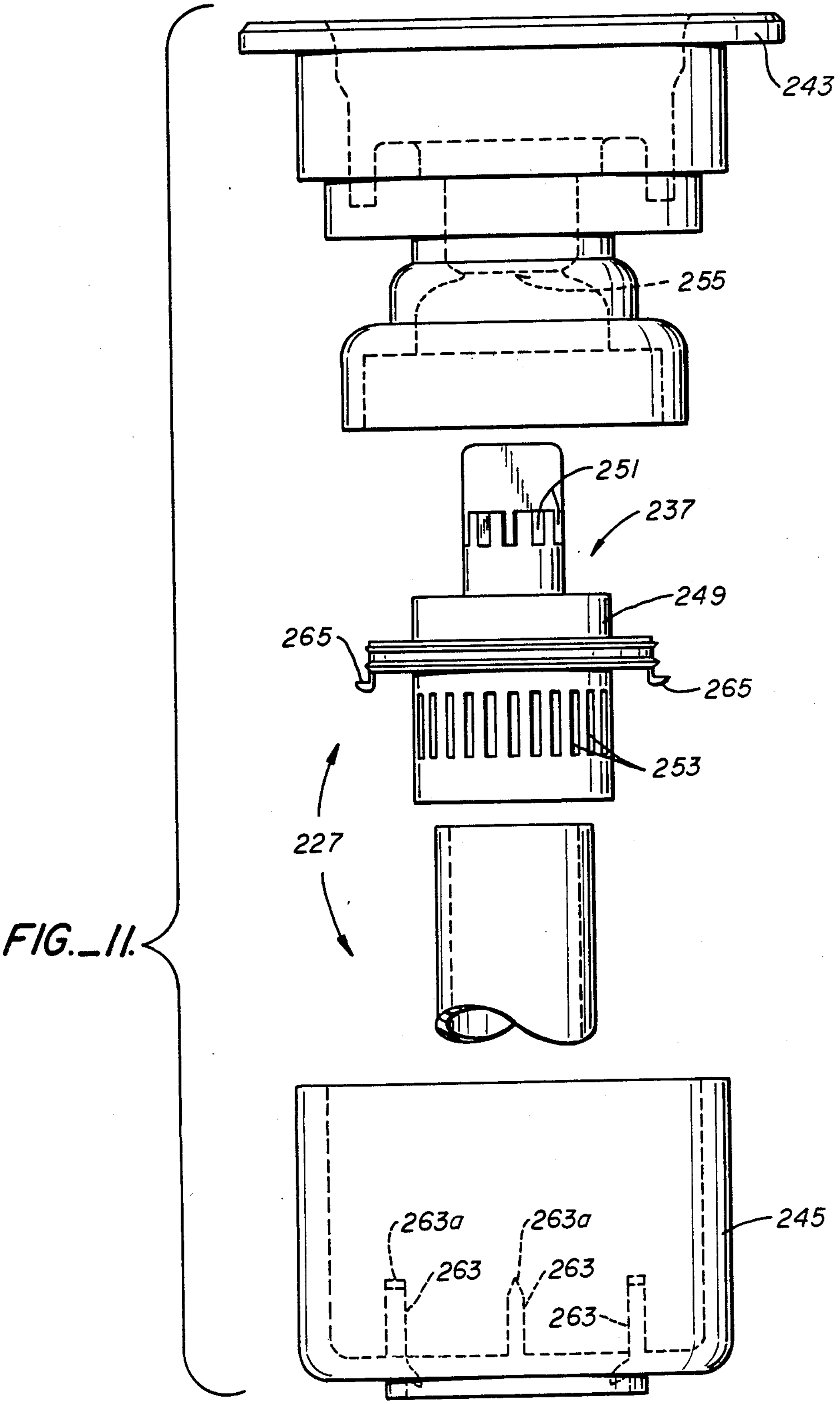
FIG. 11 is an exploded side view of a third valve assembly in accordance with the invention.

FIGS. 8, 9 and 10 show another valve assembly 180 in accordance with the invention. Cylindrical portion 182 of the housing 184 is similar to the cylindrical portion 66 in the FIGS. 2–4 embodiment, but slots 186 in interior surface 188 of the cylindrical portion 182 extend upward a greater extent than the corresponding slots 86 in the FIGS. 2–4 embodiment. Flanges 190, 192 and 194 are also differently shaped than the corresponding flanges 92, 94 and 96 in the FIGS. 2–4 embodiment. A Mylar or other flexible plastic inner container 195 is attached to fitting 197 of housing bottom 199 in place of the syphon tube 70 in the FIGS. 1–4 embodiment. In use of the FIGS. 8–10 embodiment, valve member 196 is depressed to the position shown in FIG. 9 to fill the inner container 195 with beer. For most of the filling operation, the valve assembly 180 operates in the same manner as the valve assembly 52 of FIGS. 2–4, in that the beer enters the container 195 through flow path 198, and air leaves the container 50 as inner container 195 expands during the filling operation via flow path 200. However, when the container 195 is nearly full, the valve member 192 is moved to the position shown in FIG. 10, thus blocking the flow path 200, while leaving the flow path 198 open. As the container 195 is filled with additional beer, the container 195 expands to hold the beer and occupies most of the container 50 and an elevated pressure is created in head space 202 of the container 50. When the container 195 is full, the valve member 196 is returned to the position shown in FIG. 8. The pressure in the head space 202 provides pressure for initial dispensing of the beer. As this pressure is depleted, an air pump can be used with the adapter 120 of FIGS. 5–7 to provide additional air to the container 50 through the valve assembly 180 in the same manner as in FIG. 6. The inner container 195 holding the beer isolates it from the air, thus preventing the air from oxidizing the beer. With the package incorporating the valve assembly 180, beer can be stored for long periods after dispensing has begun without deterioration due to air used to pressurize the container 50 for dispensing. In other respects than as shown and described, the construction and operation of the FIGS. 8–10 embodiment is the same as the FIGS. 1–4 embodiment.

Figure 12:
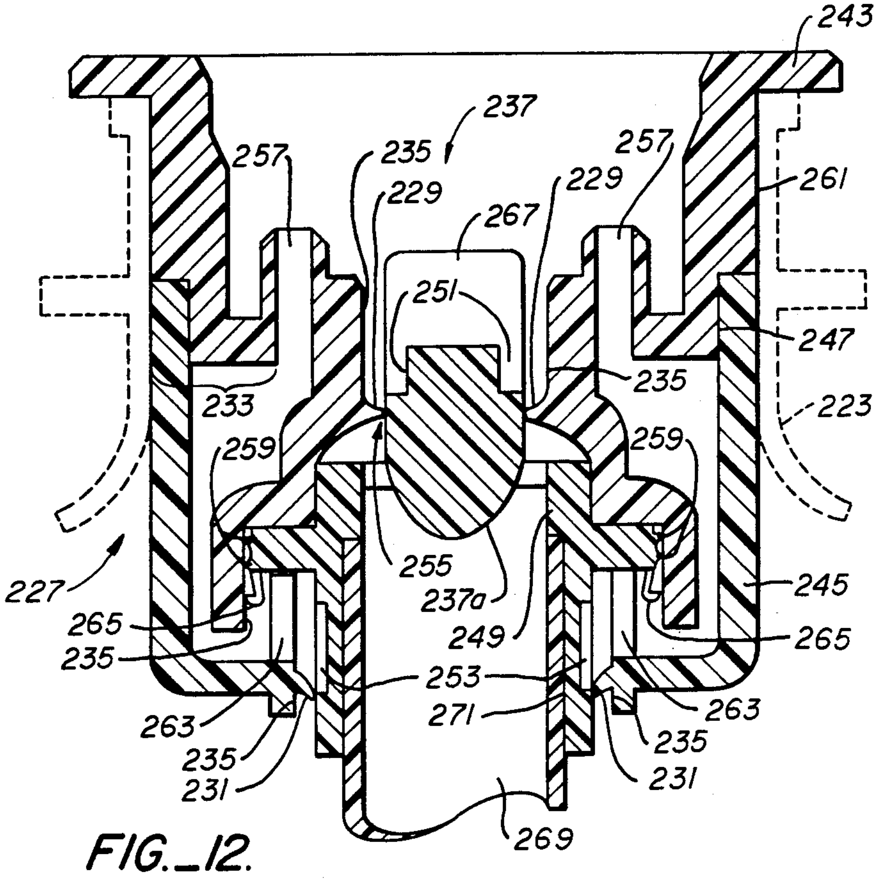
FIG. 12 is a schematic cross-section view of the valve assembly shown in FIG. 11.
Figure 13:
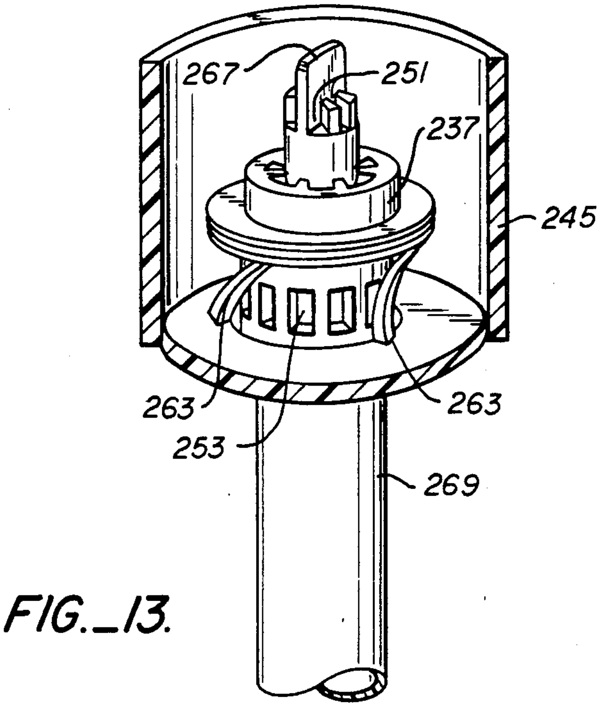
FIG. 13 is a perspective and partial cross-section view of a portion of the valve assembly shown in FIGS. 11 and 12.
Figure 14:
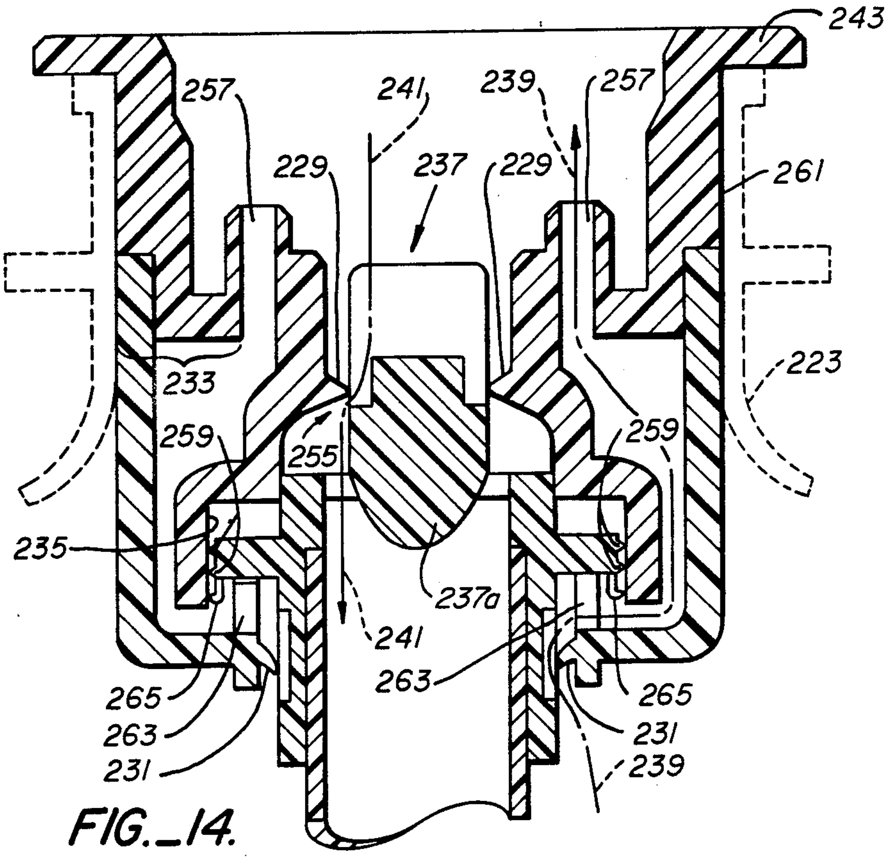
FIG. 14 is another schematic cross-section view of the valve assembly in FIG. 12, but in a different stage of operation.
Figure 15:
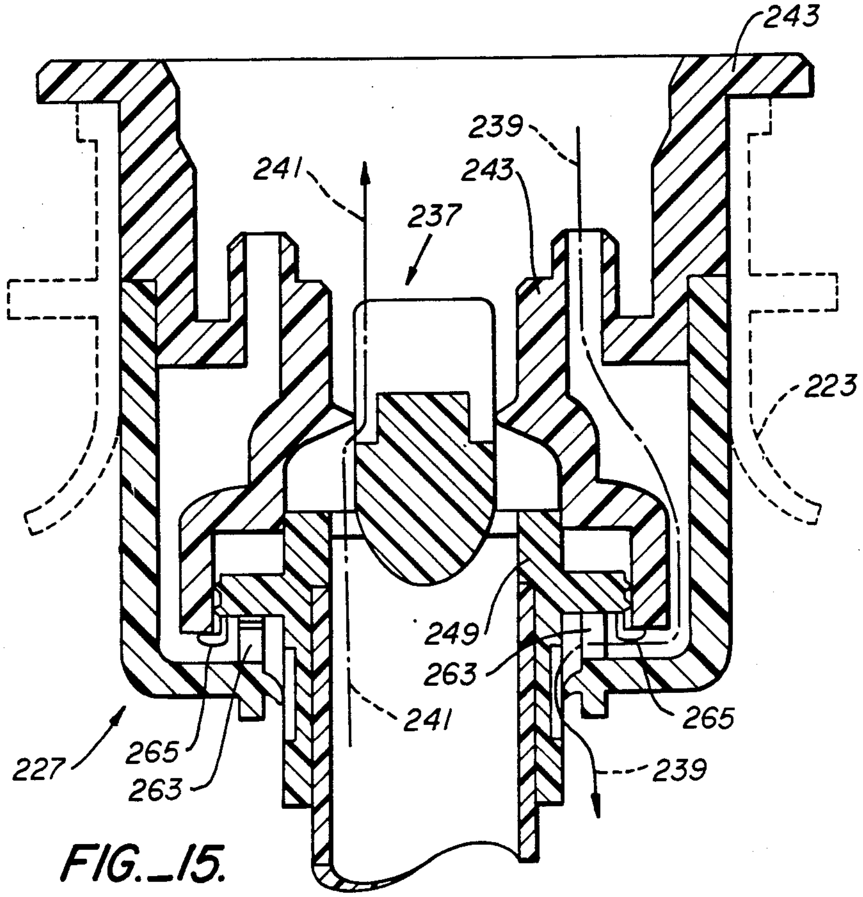
FIG. 15 is another cross-section view of the valve assembly in FIGS. 12, 13 and 14, but in still another stage of operation.

FIGS. 11–15 show another valve assembly 227 having upper and lower projections 229 and 231 (FIG. 12) mounted on valve housing 233 interior surface 235 and engaging valve member 237 to seal fluid flow paths 239 and 241 (FIGS. 14 and 15). For ease of molding, the valve housing 233 consists of two pieces 243 and 245 spin welded or bonded together at 247. The valve member 237 includes a tube 249 extending downward beyond the valve housing 233. Valve member 237 has upper and lower grooves 251 and 253. Valve housing 233 has opening 255 and vertically disposed passages 257. The projections 229 and 231, valve member 237, grooves 251 and 253, opening 255 and passages 257 coact to define the fluid flow paths 239 and 241. The rounded shape of projection 229, interior surface 235 and portion 237*a* of the valve member 237 reduces agitation of the beer in the flow path 241. Intermediate projections 259 integrally formed on valve member 237 engage surface 235 to isolate the fluid flow paths 239 and 241 from each other. The valve housing 233 is spin welded or bonded to container 223 at 261. Leaf springs 263 are integrally molded as part of the piece 245 and bias the valve member 237 upward to keep the valve assembly 227 in a normally closed position. The straight configuration of the leaf springs 263 allows them to be easily molded as part of a single step molding operation used to form the piece 245. Tapered tips 263*a* cause the leaf springs 263 to be biased in a given direction as they engage the valve member 237 when the valve member 237 is moved downward toward the leaf springs 263. Projections 265 on the tube 249 of the valve member 237 lock the valve assembly 227 in an open position by engaging the bottom of piece 243, as shown in FIG. 14, when the valve assembly 227 is fully opened to dispense beer from flow path 241. Projections 265 are also integrally formed as part of the valve member 237 in the single molding step used to form the valve member 237. Central fin-shaped portion 267 of the valve member 237 extends upward from opening 255 of the valve housing 233. When the valve assembly 227 is put together, the leaf springs are bowed slightly, as is best shown in FIG. 13, in order to preload the valve member 237 with sufficient force to keep the valve assembly 227 normally closed. Syphon tube 269 is spin welded or bonded at 271 inside the tube portion 249 of the valve member 237.

In operation, the valve member 237 is moved from its normally closed position as shown in FIG. 12 to the position shown in FIG. 14 to fill the container 223 with beer. The valve member 237 is not moved down far enough in this operation for the projections 265 to lock beneath the piece 243. The leaf springs 263 are bowed to a greater extent than shown in FIG. 13 when the valve member is in this position. The beer enters the container 223 through the flow path 241 and air in the container 223 is vented during the filling operation through the flow path 239. When the container 223 has been filled, downward force on the valve member 237 is released, and the valve member 237 returns to the position shown in FIG. 12 for shipment of the filled container 223. To dispense the beer from the container 223, an adapter (not shown) similar to the adapter 120 of FIGS. 5–7 is attached to the valve assembly 227 and a source of pressurized $CO_2$ or air and a beer tap are connected to the adapter. For this purpose, a commercially available Sankey type tap-grabber, available from Johnson Enterprises, Inc., Rockford, Ill. 61107 as item no. BJ-100 may be employed, and the valve assembly 227 is configured to engage this part. Valve member 237 is then fully depressed to the position shown in FIG. 15 so that projections 265 move beneath piece 243 to lock the valve assembly 227 in its fully opened position for dispensing the beer from the container 223 via flow path 241. The leaf springs 263 are bowed to an even greater extent than in the position of FIG. 14 when the valve member 237 is in this position. The $CO_2$ or air enters the container 223 via the flow path 239 to discharge the beer from the container 223. When the container 223 is empty, the adapter is removed from the valve assembly, but the projections 265 keep the valve assembly 227 locked in its open position. Locking the valve assembly 227 in the open position after the container 223 is empty provides an important safety feature in that pressure is not allowed to build up in the container 223, for example, when the container 223 is crushed for recycling.

Figure 16:
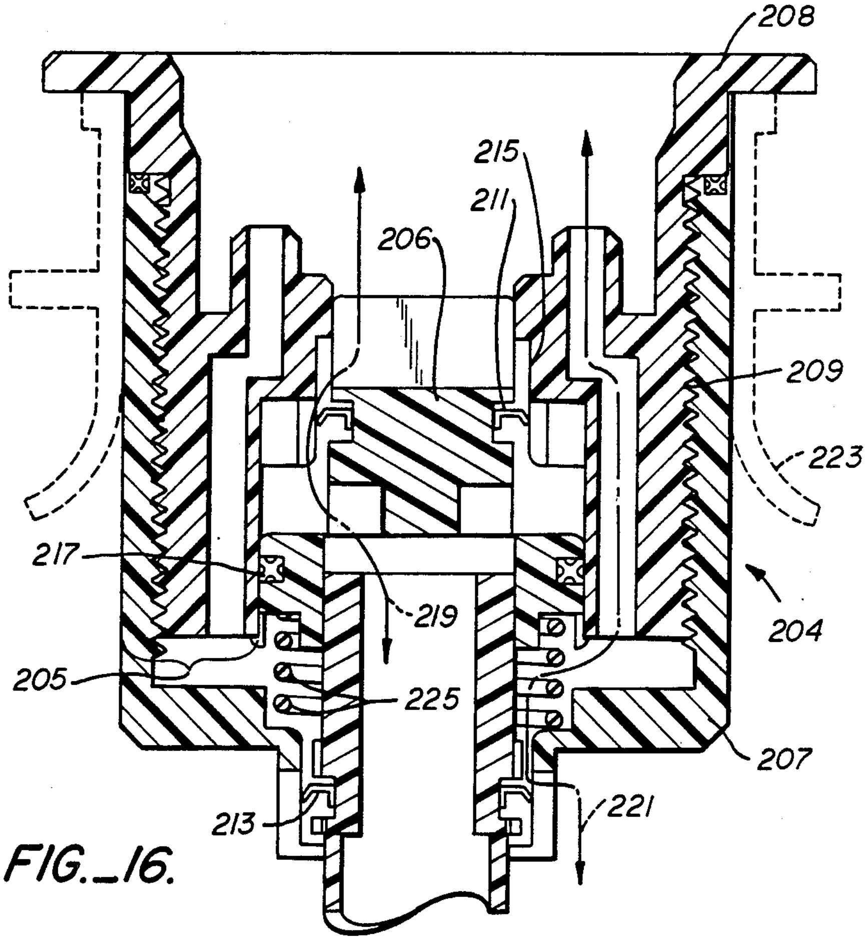
FIG. 16 is a schematic cross-section view of a fourth valve assembly in accordance with the invention.
Figure 17:
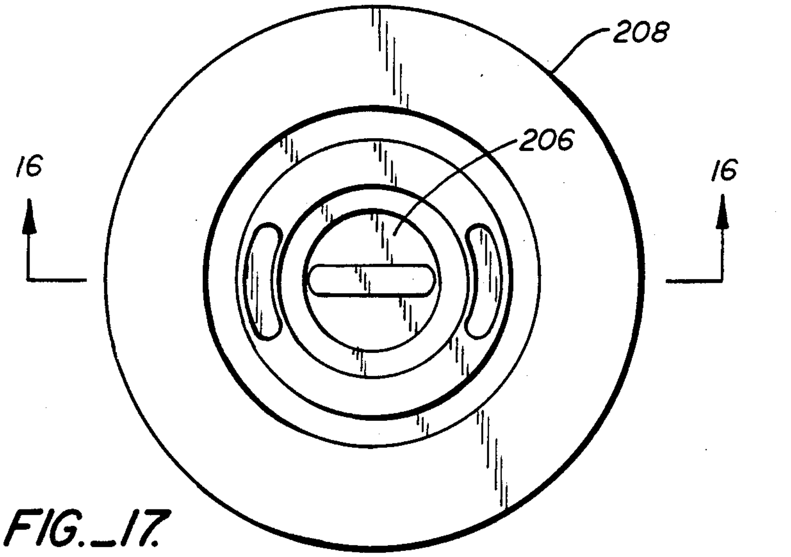
FIG. 17 is a top view of the valve assembly shown in FIG. 16.

FIGS. 16 and 17 show another valve assembly 204 in accordance with the invention. A top view of the valve assembly 227 of FIGS. 11–16 would be virtually identical in configuration to FIG. 17. The valve assembly 204 has a valve housing 205 and a valve member 206. The valve housing is formed from two pieces 207 and 208, which are screwed together with threads 209, in order to allow the configuration of the housing 205 to be formed more easily by a plastic molding process. Upper and lower circumferential projections 211 and 213 on valve member 206 extend between the valve member 206 and the valve housing 205 and engage inside surface 215 of the valve housing 205 when the valve assembly 204 is in its closed position. Similarly, quad ring 217 extends between the valve housing 206 and the valve member 205 in sealing engagement against inside surface 215 to isolate fluid flow paths 219 and 221 created by the valve housing 205 and the valve member 206. Spring 225 biases the valve member 206 upward, so that the valve assembly 204 is normally closed, with the fluid flow paths 219 and 221 sealed by the upper and lower projections 211 and 213, respectively.

In operation of the valve assembly 204, the fluid flow paths 219 and 221 are bidirectional, as in the FIGS. 11–16 embodiment. For filling container 223 in which the valve assembly 204 is installed, valve member 206 is displaced from its normally closed position to the position shown, opening both fluid flow paths 219 and 221. With the valve member 206 in this position, beer flows into the container 223 downward through the fluid flow path 219. At the same time, air in the container 223 is displaced upward through the fluid flow path 221. At the conclusion of filling, the valve member 206 is allowed to return to its normally closed position.

When it is desired to discharge the beer from the container 223, a Sankey type tap-grabber or other adapter head (not shown), similar to the adapter head 120 (FIGS. 5–7) is attached to the valve assembly 204, and the combination is operated in the same manner as the combination shown in FIGS. 5–7. The beer is discharged upward through the fluid flow path 219 and carbon dioxide, air or other pressurized gas is supplied to the container 223 downward through the fluid flow path 221 to force the beer out of the container 223. The substantially straight configuration of the fluid flow path 219, as in the FIG. 11–14 embodiment, provides a minimum of agitation of the beer during both the filling and discharging operations. Other than as shown and described, the construction and operation of the FIGS. 16–17 embodiment is the same as that of the FIGS. 11–15 embodiment.

Figure 18:
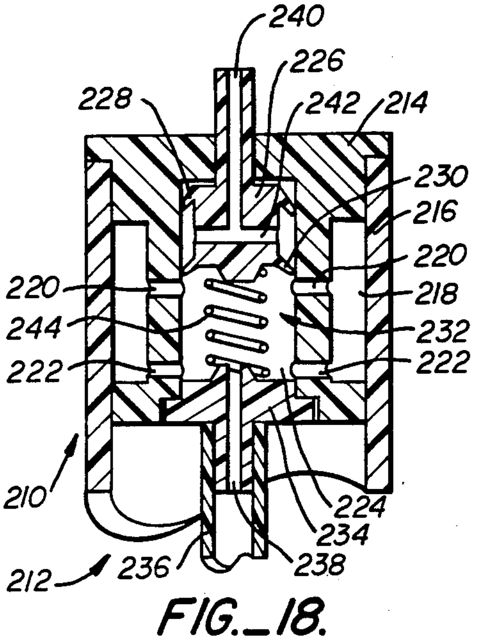
FIG. 18 is a schematic cross-section view of a fifth valve assembly in accordance with the invention.
Figure 19:
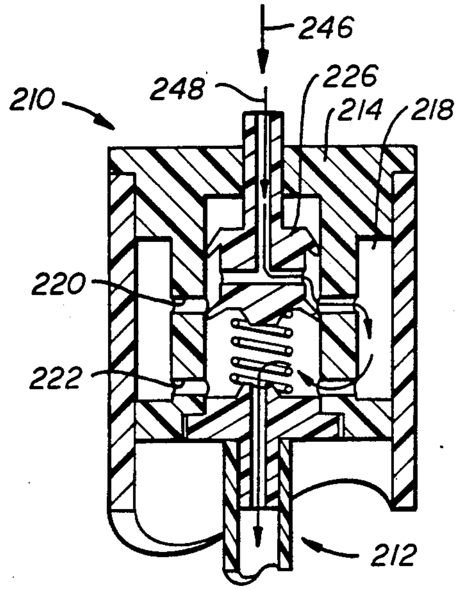
FIG. 19 is another schematic cross-section view of the valve assembly in FIG. 18, but during operation.

FIGS. 18 and 19 show another valve assembly 210 in accordance with the invention, particularly adapted for use with a small polyethylene terapthalate (PET) aerosol container 212. The valve assembly 210 has a housing 214 dimensioned to fit in sealing engagement with neck 216 of the container 212. The housing 214 and neck 216 form an annular chamber 218 between them. Upper and lower passages 220 and 222 communicate between the annular chamber 218 and axial bore 224 in housing 214. Valve member 226 is slidably positioned within the bore 224 with its flanges 228 and 230 in sealing engagement against inside surface 232 of the bore 224. Flange 234 attaches tube 236 to the housing 214 and has an axial passage 238. Axial passage 240 in the valve member 226 communicates with openings 242 between the flanges 228 and 230. Compressed spring 244 between the flange 234 and the valve member 226 urges the valve member 226 upward in the bore 224 to the position shown in FIG. 18, to keep the valve assembly 210 in a normally closed state.

To fill the container 212, a downward force, as indicated at 246, is applied to the valve member 226 to move it to the position shown in FIG. 19. A liquid and a suitable propellant is then introduced through flow path 248 into the container 212, and the force 246 is removed, allowing the valve member 226 to return to the normally closed position shown in FIG. 18. When it is desired to dispense the liquid and propellant as an aerosol spray, the valve member 226 is again depressed to the position shown in FIG. 19. As the liquid and propellant leave the package 212 through the reversed flow path 248, flow through the passages 220 and 222 and the annular chamber 218 mixes the liquid and gaseous propellant thoroughly prior to their exit from the valve assembly 210.

Figure 20:
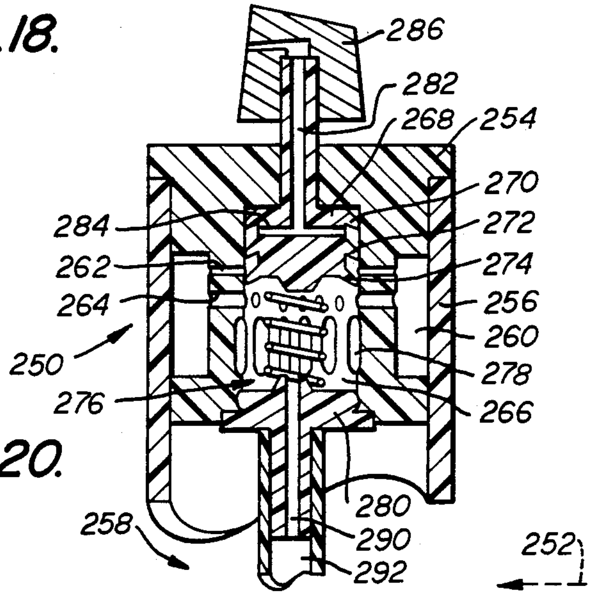
FIG. 20 is a schematic cross-section view of a sixth valve assembly in accordance with the invention.
Figure 21:
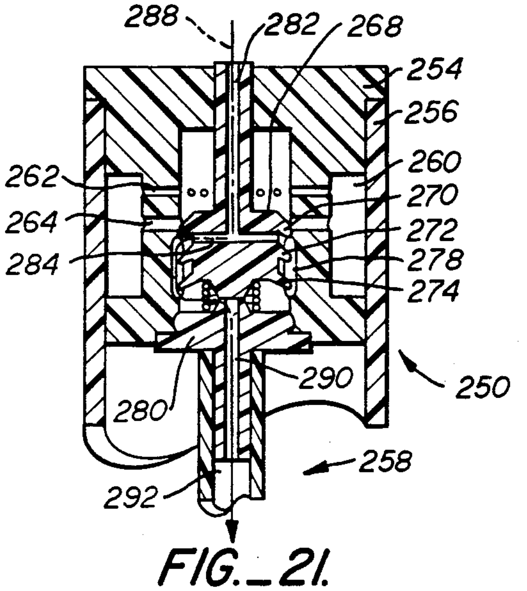
FIGS. 21 and 22 are additional schematic cross-section views of the valve assembly in FIG. 20, but in different stages of operation.
Figure 22:
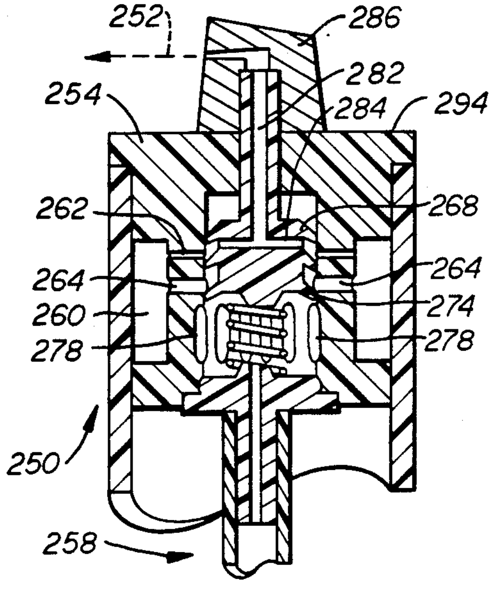

FIGS. 20, 21, and 22 show another valve assembly 250, which will provide a metered dose of a spray 252. The valve assembly 250 includes a housing 254 sealed into neck 256 of container 258 to form an annular chamber 260, similar to the annular chamber 218 in FIGS. 18–19. Upper and lower passages 262 and 264 communicate between the annular chamber 260 and axial bore 266 in the housing 254. Valve member 268 is slidably positioned in the axial bore 266 with flanges 270, 272 and 274 in sealing engagement against inside surface 276 of the axial bore 266. Slots 278 extend downward below the lower passages 264 toward flange 280 in the lower end of the axial bore 266. Axial bore 282 in the valve member 268 communicates with apertures 284 between the flanges 270 and 272 of the valve member 268.

To fill the package 258, the valve member 268 is moved to the position shown in FIG. 21 prior to attachment of the spray cap 286. With the valve member 268 in this position, the liquid and a suitable gas propellant flow into the package 258 through flow path 288. The flow path 288 includes the axial bore 282, apertures 284, slots 278, axial bore 290 in flange 280, and tube 292. When the package 258 has been filled, the valve member 268 is returned to the position shown in FIG. 20, and the spray cap 286 is attached to the distal end of the axial bore 282. With the valve member 268 in this position, the annular chamber 260 is in communication with the pressurized liquid and propellant in the package 258, so that a quantity of the liquid and propellant, determined by the pressure in the package 258 and the volume of the chamber 260, is present in the chamber 260.

FIG. 22 shows the valve assembly 250 with the valve member 268 in dispensing position. In this position, the lowest flange 274 on the valve member 268 rests between the lower passages 264 and the top of slots 278. The annular chamber 260 is therefore not in communication with the liquid and propellant in the remainder of the package 258 at the time that the discharge of spray 252 takes place. The spray cap 286 bottoms out on surface 294 of the housing 254 to prevent the flange 274 from reaching the slots 278. A premeasured dose of the spray 252 is then discharged from the annular chamber 260 through the upper passages 262, apertures 284, axial bore 282 and the spray cap 286.

When downward pressure on the spray cap 286 is released, the valve member 268 returns to the position shown in FIG. 20. Once again, the annular chamber 260 is in communication with the liquid and propellant in the remainder of the package 258 through the lower passages 264, and a measured dose of the liquid and propellant again enters the annular chamber 260 from the rest of the package 258.

FIGS. 23–26 show another valve assembly 300 in accordance with the invention, for use with a large PET container 302. The assembly 300 is similar to the assembly 210 in FIGS. 18 and 19, but modified to fit in the container 302. A generally cup shaped housing 304 is spin welded or ultrasonically bonded at lip 306 to neck 308 of the container 302 and extends downward into the container. Projection 310 having axial bore 312 engages tube 314. Insert 316 extends into the housing 304 to define an annular chamber 318. Top 320 integrally formed as part of the insert 316 extends over the housing 304 and is also spin welded or ultrasonically bonded to the neck 308 at 322. Upper and lower passages 324 and 326 communicate between the annular chamber 318 and interior 328 defined by the insert 316 and housing 304. Valve member 330 is slidably mounted in interior 328 of insert 316, with flanges 332 and 334 in sealing engagement against interior surface 336 of the insert 316. Projection 338 of valve member 330 extends through opening 340 in top 320 and has an axial bore 342 communicating with apertures 344 between the flanges 332 and 334 of the insert 330. Compressed spring 346 between the housing 304 and the valve member 330 biases the valve member 330 upward to the position shown in FIG. 23.

In operation, when the valve member 330 is pushed downward so that apertures 344 are communication with the upper passages 324, liquid and propellant under pressure in the container 302 is discharged from the container 302 in a discharge path including the bore 312, interior 328, passage 326, annular chamber 318, passages 324, apertures 344 and bore 342. The triangular shape of the passages 324 allows the size of the flow path to increase as the flange 344 passes over them, thus allowing the flow rate of the aerosol spray to be modulated. The annular chamber 318 assures thorough mixing of the liquid and propellant in the discharge flow path before they leave the package.

Figure 23:
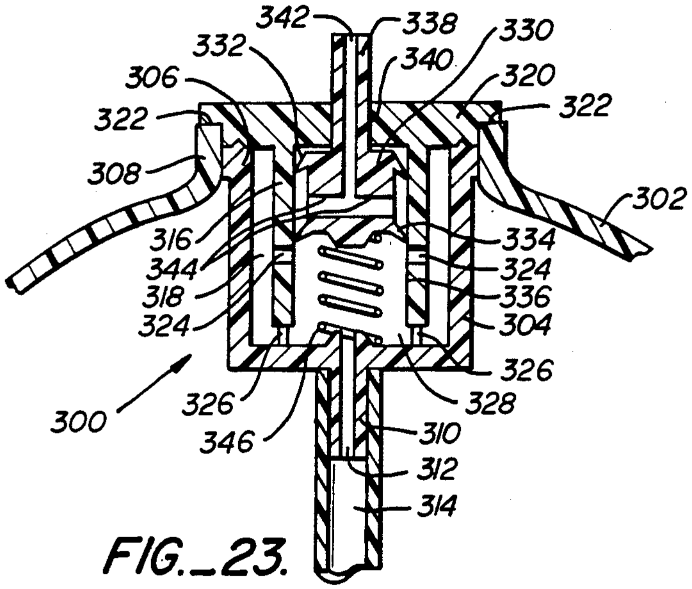
FIG. 23 is a schematic cross-section view of a seventh valve assembly in accordance with the invention.
Figure 25:
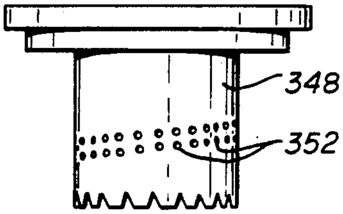
FIGS. 25 and 26 are side views of alternative embodiments of a portion of the valve assembly shown in FIGS. 23 and 24.
Figure 24:
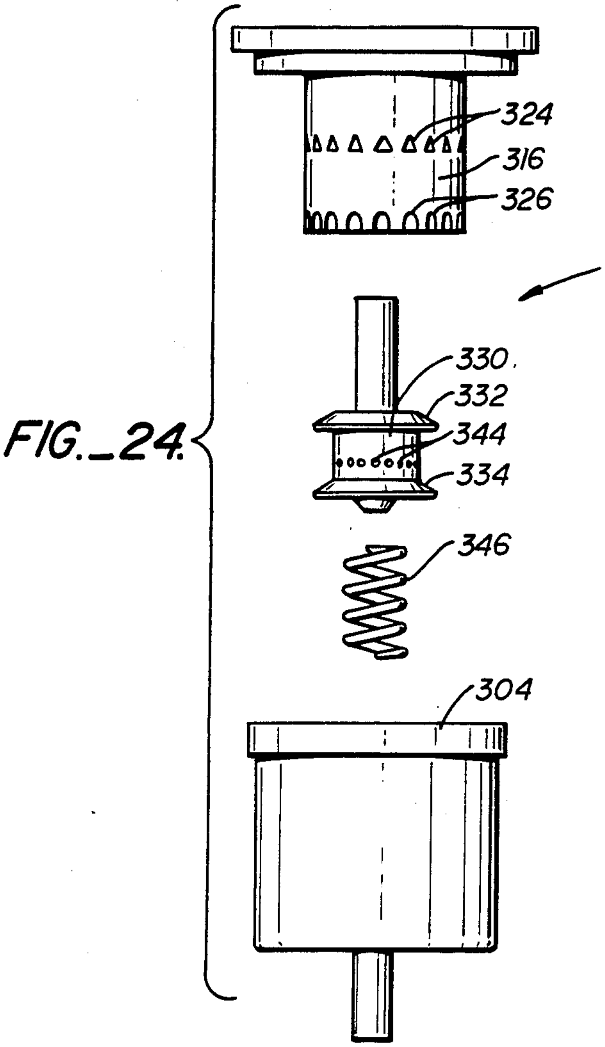
FIG. 24 is an exploded side view of the valve assembly shown in FIG. 23.
Figure 26:
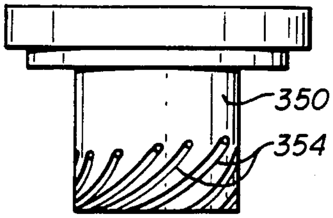

FIGS. 25 and 26 show alternative forms of inserts 348 and 350, which may be substituted for the insert 316 shown in FIGS. 23 and 24. The insert 348 has its apertures 352 extending in an inclined pattern around the insert 348. This means that, as the valve member 330 (FIGS. 23 and 24) is moved downward within the interior 328 a greater extent, a larger number of the apertures 352 are positioned between flanges 332 and 334 of the valve member 330. As the number of apertures 352 between the flanges 332 and 334 is increased, a larger flow path is defined, thus allowing the discharge rate of liquid and propellant from the container 302 to be increased. In other respects, the construction and operation of a valve assembly including the insert 348 is the same as in the FIGS. 23 and 24 embodiment.

In FIG. 26, the insert 350 has the separate passages 324 and 326 of the insert 316 (FIGS. 23 and 24) replaced with inclined slots 354. With this insert 350, lower flange 334 of the insert 330 divides the slots 354 into two portions, with the relative size of the portions depending on the position of the valve member 330 in interior 328. With the valve member 330 midway in its path of travel, the flow path of the liquid and propellant from the container 302 is largest, with the correspondingly largest flow rate of discharge.

Figure 27:
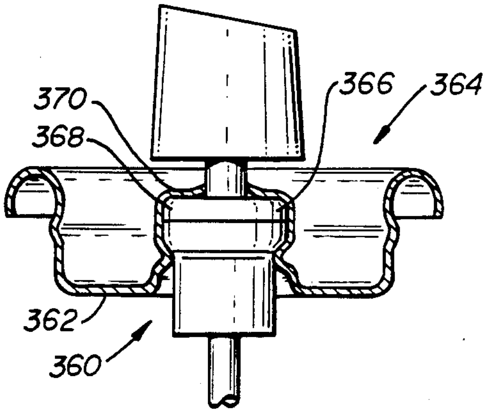
FIG. 27 is a cross-section view of a seventh valve assembly in accordance with the invention.

FIG. 27 shows another valve assembly 360 in accordance with the invention, which is configured to fit inside an industry standard aerosol cup 362, so that the valve assembly 360 may be used in a standard metal aerosol spray can 364. The internal construction of the valve assembly 360 is the same as the valve assembly 300 shown in FIGS. 23 and 24, but top 366 is configured with a rounded edge 368 to accommodate rolled metal sleeve 370 of the aerosol cup 362. The external configuration of the valve assembly 360 is thus identical to the external configuration of conventional Abplanalp valves employed in these aerosol packages, but the valve assembly 360 has the flow rate regulation characteristics of the FIGS. 23–24 embodiment. Alternatively, inserts having the aperture configurations of the FIGS. 25 and 26 inserts 348 and 350, but modified at their top in the same manner as the top 366 in FIG. 27, could be employed in the valve assembly 360.

In practice, the valve assemblies of this invention are advantageously fabricated from a suitable molded plastic material. For this purpose, an injection molded copolyester plastic is preferably employed. Such plastic parts give a low cost, easily manufactured valve assembly.

It should now be readily apparent to those skilled in the art that a novel valve assembly and package incorporating the valve assembly capable of achieving the stated objects of the invention has been provided. The valve assembly and package of this invention is configured so that it can be adapted to meet a variety of specific requirements in the packaging of pressurized liquids, from draft beer packaging to aerosol spray containers. Multiple flow paths and related configurations employed in the valve assembly of this invention allow both filling and dispensing of pressurized liquids through the valves, thus eliminating the need for cold filling prior to insertion of the valve assembly in a package. An improved draft beer container using the valve assembly of this invention allows air to be introduced to the container through the valve assembly and not contact draft beer in the container, thus allowing air to be used to pressurize the container without oxidizing the beer. The valve assembly and adapter fills a draft beer container, pressurizes the container and dispenses the draft beer in an improved manner and incorporates a positive seal between the valve assembly and the adapter. The valve assembly of this invention provides a flow path for the beer that minimizes agitation and incorporates a lock open feature to prevent dangerous pressures when the empty container is crushed. The configuration of the valve assembly allows it to be easily fabricated by molding, such as of plastic. The valve assembly of this invention also allows regulation of pressurized liquid flow rate and improved mixing of an aerosol spray.

It should further be apparent to those skilled in the art that various changes in form and details of the invention as shown and described may be made. It is intended that such changes be included within the spirit and scope of the claims appended hereto.

What is claimed is:

1. A valve assembly, which comprises an insert dimensioned and configured to fit in a necked opening of a container, said insert defining a valve housing, a valve member slideably mounted in said valve housing, said valve housing having a plurality of apertures located along a path of travel of said valve member in said valve housing, the apertures extending throught the housing to an interior surface thereof, said valve member and said valve housing having a plurality of projections spaced along a lenght of said valve member and said valve housing extending between the interior surface of said valve husing and said valve member in sealing relationship, a plurality of grooves facing between said valve housing interior surface and said member, the projections, valve housing interior surface, apertures, grooves and valve member coacting to provide multiple flow paths throough said valve assembly when the valve member is in a first position and to seal the flow paths when the valve member is in a second position, and means biasing said valve member to the second position, at least one of the flow paths being for filling the container with a liquid and another of the flow paths being for releasing gas from the container while the container is filling with the liquid throught the at least one flow path, and at least one of the flow paths being for dispensing the liquid from the container.

2. In combination, the valve assembly of claim 1 and a dispensing adapter having an adapter housing with an open end having a first passage configured to fit over said valve assemby in sealing relationship, said adapter housing having a second passage extending upward from the first passage, an adapter valve member slideably mounted in said second passage between a first position and a second position, said adapter valve member being configured to engage said valve assemby valve member in sealing relationship, first and second ports passing through said adapter housing to said second passage, said first port being conffigured for connection to a source of pressurized gas, said second port being configured for connection to a tap for supplying liquid from the container, and means for moving said adapter valve member between the first and second positions, said first port being positioned to supply pressurized gas from the pressurized gas source through said valve assembly when said adapter valve member is in its first position, said adapter valve member and said adapter housing having a plurality of projections extending between an interior surface of said second passage and said adapter valve member in sealing relationship, said second port being positioned to coact with said second passage, adapter projections, adapter valve member, valve assembly projections and valve assembly valve member to define a flow path for the liquid from the container to the tap, the tap and the source of pressurized gas being sealed from the container when said adapter valve member is in its second position.

3. The combination of claim 2, further including an outer container having a necked opening, the valve assemby fitted in the necked opening, and a flexible inner container positioned within said outer container and connected to said valve assembly to receive liquid from said valve assembly and to discharge the liquid through said valve assembly, said outer container being connected to receive the pressurized gas through said valve assembly.

4. The combintain of claim 2 in which said means for moving said adapter valve member is configured to lock so that said adapter valve member is maintained in the first position, said adapter valve member and said valve assembly member having a resilient sealing member between them when said adapter valve member and said valve assembly valve member are in engaged relationship, said means for moving said adapter valve member, said adapter valve member and said valve assembly valve member each being further configured so that said valve assembly valve member reaches its first position before said means for moving said adapter valve member reaches its locking position, whereby a positive seal is maintained between said adapter valve member and said valve assembly valve member when said adapter valve member is in its locking position.

5. In combination, the valve assembly of claim 1 and a container having a necked opening, said valve assembly being fitted into the necked opening of said container.

6. The combination of claim 5 in which said container is an outer container, said combination further comprising a flexible inner container positioned within said outer container and connected to said valve assembly to receive liquid from said valve assembly.

7. The valve assembly of claim 1 in which said valve member has a hollow lower end, there are a plurality of apertures extending through said valve member from the hollow lower end and an outer surface of said valve member, a first portion of said plurality of grooves and a first one of said plurality of projections coact with said valve member plurality of apertures to define the filling and dispensing flow path, and a second portion of the plurality of grooves, a second one of the plurality of projections and said plurality of valve housing apertures define the gas releasing flow path.

8. The vlave assembly of claim 7 in which the gas releasing flow path includes a plurality of axially extending passages along a length of said valve housing.

9. The valve assembly of claim 7 in which said plurality of projections are on said valve member.

10. The valve assembly of claim 7 in which said plurality of projectins are on said valve housing.

11. The valve assembly of claim 7 in which said valve housing has a lower edge and said valve housing apertures comprise a plurality of notches extending into said valve housing from the lower edge of said valve housing.

12. The valve assembly of claim 7 additionally comprising means for locking said valve member in its first position.

13. The valve assembly of claim 12 in which said valve housing has a bottom edge and said valve member locking means comprises a plurality of projections on said valve member positioned to fit beneath the bottom edge on said valve housing when said valve member is in its first position.

14. The valve assembly of claim 7 in which said biasing means comprises a plurality of leaf springs extending upward from said valve housing to engage said valve member, said plurality of leaf springs being configured to bow as said valve member is moved toward its first position.

15. In combination, the valve assembly of claim 1 and a container having a necked opening, said valve assemby being fitted into the necked opening of said container.

16. The valve assembly of claim 1 in which said pluraltiy of projections are on said valve member.

17. The valve assembly of claim 1 in which said plurality of projections are on said valve housing.

18. A valve assembly, which comprises an insert dimensioned and configured to fit in a necked opening of a container, said insert defining a valve housing, a valve member slideably mounted in said valve housing, said valve housing having a plurality of apertures located along a path of travel of said valve member in said valve housing, the apertures extending through the housing to an interior surface thereof, said valve member and said vlave housing having a plurality of projections spaced along a length of said valve member and said valve housing extending between the interior surface of said valve housing and said valve member in sealing relationship, the projections, valve housing interior surface, apertures and valve member coacting to provide a flow path through said valve assembly when the valve member is in a first position and to seal the flow path when the valve member is in a second position, and means biasing said valve member to second position, said projections, housing interior surface, apertures and valve member coacting to define a variable rate flow path, said valve member being connected to a manual actuating member, and the variable flow rate being controllable by positioning said valve member along the path of travel with said manual actuating member, said plurality of apertures consisting of a first set of apertures providing a first flow rate at the first position of said valve member and a second set of apertures providing a second flow rate at a third position of said valve member.

19. In combination, the valve assembly of claim 18 and a container having a necked opening, said valve assembly being fitted into the necked opening of said container.

20. A valve assembly, which comprises an insert dimensioned and configured to fit in a necked opening of a container, said insert defining a valve housing, a valve member slideably mounted in said valve housing, said valve housing having a plurality of apertures located along a path of travle of said valve member in said valve housing, the apertures extending through the housing to an interior surface thereof, said valve member and said valve housing having a plurality of projections spaced along a length of said valve member and said valve housing extending between the interior surface of said valve housing and said valve member in sealing relationship, the projections, valve housing interior surface, apertures and valve member coacting to provide a flow path through said valve when the valve member is in a first position and to seal the flow path when the valve member is in a second position, and means biasing said valve member to the second position, said plurality of apertures being configured so that an increasing area of the apertures are uncovered between the projections during the path of travel of said valve member between the first and second positions, the valve member being configured to pass the flow path between the projections, change in the area of the apertures uncovered between the projections defining the variable rate flow path.

21. The valve assembly of claim 20 in which the plurality of apertures are each triangular in shape.

22. The valve assembly of clam 20 in which the plurality of apertures comprise a plurality of slots inclined along the path of travel of said valve member.

23. A multiple path valve assembly, which comprises an insert dimensined and configured to fit in a necked opening of a container, said insert defining a valve housing, a valve member slideably mounted in said valve housing, said valve housing having a plurality of apertures located along a path of travel of said valve member in said valve housing, the apertures extending through the housing to an interior surface thereof, said valve member and said valve housing having a plurality of projections spaced along a length of said valve member and said valve housing, extending between the interior surface of said valve housing and said valve member in sealing relationship, the projections, housing interior surface, apertures and valve member coacting to provide multiple flow paths through said valve assembly when said valve member is in a first position, the projections, valve member and the interior surface of said valve housing serving to separate the flow paths from one another, and means biasing said valve member to a second position in said valve housing in which the multiple flow paths are sealed, at least one of the flow paths being for filling the container with a liquid and for dispensing the liquid from the container and another of the flow paths being for releasing gas from the container while the container is filling with the liquid through the at least one flow path, said valve member having a hollow lower end, there being a plurality of apertures extending through said valve member from the hollow lower end and an outer surface of said valve member, there being a plurality of grooves between said valve housing and said valve member, a first portion of said plurality of grooves and a first one of said plurality of projections coating with said valve member plurality of apertures to define the filling and dispensing flow path, a second portion of the plurality of grooves, a second one of the plurality of projections and said plurality of valve housing apertures defining the gas releasing flow path.

24. The multiple path valve assembly of claim 23 in which the gas releasing flow path includes a plurality of axially extending passages along a lenght of said valve housing.

25. The multiple path valve assemby of claim 23 in which said plurality of projections are on said valve member.

26. The multiple path valve assembly of claim 23 in which said plurality of projections are on said valve housing.

27. The multiple path valve assembly of claim 23 in which said valve housing has a lower edge, and said valve housing apertures comprise a plurality of notches extending into said valve housing from the lower edge of said valve housing.

28. In combination, the valve assembly of claim 23, and a container having a necked opening, said valve assembly being fitted into the necked opening of said container.

29. The combination of claim 28 in which said container is an outer container, said combination further comprising a flexiable inner container positioned within said outer container and connected to said valve assembly to receive liquid from said valve assembly.

30. The valve assembly of claim 23 in which said plurality of projections are on said valve member.

31. The valve assembly of claim 23 in which said plurality of projections are on said valve housing.

32. The valve assembly of claim 23 additionally comprising means for locking said valve member in its first position.

33. The valve assembly of claim 32 in which said valve housing has a bottom edge and said valve member locking means comprises a plurality of projections on said valve member positioned to fit beneath the bottom edge on said valve housing when said valve member is in its first position.

34. The valve assembly of claim 23 in which said biasing means comprises a plurality of leaf springs extending upward from said valve housing to engage said valve member, said plurality of leaf springs being configured to bow as said valve member is moved toward its first position.

35. The mutiple path valve assembly of claim 23 in which the multiple flow paths each provide a different flow rate through said valve assembly, said valve member is connected to a manual actuating member, and the flow rate is controllable by positioning said valve member along the path of travel with said manual actuating member.

36. In combination, a multiple path valve assembly, which comprises an insert dimensioned and configured to fit in a necked opening of a container, said insert defining a valve housing, at least one valve member slideably mounted in said valve housing, said valve housing having a plurality of apertures located along a path of travel of said at least one valve member in said valve housing, the apertures extending through the housing to an interior surface thereof, said at least one valve member and said valve housing having a plurality of projections spaced along a length of said at least one valve member and said valve housing, extending between the interior surface of said valve housing and said at least one valve member in sealing relationship, the projections, housing interior surface, apertures and at least one valve member coacting to provide multiple flow paths through said valve assembly when said at least one valve member is in a first position, the projections, at least one valve member and the interior surface of said valve housing serving to separate the flow paths from one another, and means biasing said at least one valve member to a position in said valve housing in whihc the multiple flow paths are sealed and dispensing adapter having an adapter housing with an open end configured to fit over said valve assembly in sealing relationship, an adapter valve member slideably mounted in said adapter housing between a first position and a second position, said adapter valve member being configured to engage said valve assembly valve member in sealing relationship, first and second ports passing through said adapter housing, said first port being configured for connection to a source of pressurized gas, said second port being configured for conenction to a tap for supplying liquid form the container, and means for moving said adapter valve member between the first and second positions, said first port being positioned to supply pressurized gas from the pressurized gas source through said valve assembly when said adapter valve member is in its first position, said adapter valve member and said adapter valve housing having at least one projection extending between an interior surface of said adapter housing and said adapter valve member in sealing relationship, said second port being positioned to coact with said adapter housing, the at least one projection extending between said adapter housing and said adapter valve member, said adapter valve member, at least one of said valve assemby projections and said at least one valve assemby valve member to define a flow path for the liquid form the container to the tap, the tap and the source of pressurized gas being sealed form the container when said adapter valve member is in its second position.

37. The combination of claim 36 further including an outer container having a necked opening, the valve assembly fitted in the necked opening, and a flexible inner container positioned within said outer container and conencted to said valve assembly to receive liquid from said valve assembly and to discharge the liquid through said valve assembly, said outer container being connected to receive the pressurized gas through said valve assembly.

38. The combination of claim 37 in which said means for moving said adapter valve member is configured to lock that said adapter valve member is maintained in the first position, said adapter valve member and said assembly at least one valve member having a resilient sealing member between them when said adapter valve member and said valve assembly at least one valve member are in engaged relationship, said means for moving said adapter valve member, said adapter valve member and said valve assembly at least one valve member each being further configured so that said valve assembly at least one valve member reaches its first position before said means for moving said adapter valve member reaches its locking position, whereby a positive seal is maintained between said adapter valve member and said valve assembly at least one valve member when said adapter valve member is in its locking position.

39. The combination of claim 36 in which said means for moving said adapter valve member is configured to lock so that said adapter valve member is maintained in the first position, said adapter valve member and said valve assembly at least one valve member having a resilient sealing member between them when said adapter valve member and said valve assembly at least one valve member are in engaged relationship, said means for moving said adapter valve member, said adapter valve member and said valve assemby at least one valve member each being further configured so that said valve assembly at least one valve member reaches its first position before said means for moving said adapter valve member reaches its locking position, whereby a positive seal is maintained between said adapter valve member and said valve assembly at least one valve member when said adapter valve member is in its locking position.

40. The combinaiton of claim 39 in which said dispensing adapter plurality of projections are on said adapter valve member.

41. The combination of claim 36 in which said means biasing said at least one valve member to the second position in which the multiple flow paths are sealed comprises at least in part carbonation pressure from a beverage in the container.

42. A valve assemby, which comprises an insert dimensioned and configured to fit in a necked opening of a container, said insert defining a valve housing, a valve member slideably mounted in said valve housing, said valve assembly being open when said valve member is in a first position and closed when said valve member is in a second position, means biasing said valve member to the second position, and means engageable between said valve member and said valve housing for locking said valve member in its first position when said valve member is moved from the second position to the first position, said valve housing having a bottom edge and said valve member locking means comprising a plurality of projections on said valve member positioned to fit beneath the bottom edge on said valve housing when said valve member is in its first position.

43. A multiple path valve assembly, which comprises an insert dimensioned and configured to fit in a necked opening of a container, said insert defining a valve housing, at least one valve member slideably mounted in said valve housing, said valve housing having a plurality of apertures located along a path of travel of said at least one valve member in said valve housing, the apertures extending through the housing to an interior surface thereof, said at least one valve member and said valve housing having a plurality of projections spaced along a length of said at least one valve member and said valve housing, extending between the interior surface of said valve housing and said at least one valve member in sealing relationship, the projections, housing interior surface, apertures and at least one valve member coacting to provide multiple flow paths through said valve assemby when said at least one valve member is in a first position, the projections, at least on valve member and the interior surface of said valve housing serving to separate the flow paths from one another, and means biasing said at least one valve member to a position in said valve housing in which the multiple flow paths are sealed, at least one of the flow paths being configured for filling the container with a liquid and another of the flow paths being configured for releasing gas from the container while container is filling with the liquid through the at least one flow path, at least one of the flow paths being configured for applying a gas pressure to the liquid after container has been filled, and at least one of the flow paths being configured for dispensing the liquid from the container in response to the applied gas pressure.

44. The combination of claim 43 further including an outer container having a necked opening, the valve assembly fitted in the necked opening, and a flexible inner container positione within said outer container and connected to said valve assemby to receive liquid from said valve assembly and to discharge the liquid through said valve assembly, said outer container being connected to receive the pressurized gas through said valve assembly 45. The combination of claim 43 in which said means biasing said at least one valve member to the second position in which the multiple flow paths are sealed comprises at least in part carbonation pressure from a beverage in the container.

* * * * *